(12) United States Patent
Bluhm et al.

(10) Patent No.: US 9,104,187 B2
(45) Date of Patent: Aug. 11, 2015

(54) SYSTEM AND METHOD FOR OPERATING A WIND ENERGY INSTALLATION OR WIND FARM

(75) Inventors: Roman Bluhm, Madrid (ES); Sebastian Friederich, Rendsburg (DE); Jens Altemark, Rendsburgs (DE)

(73) Assignee: SENVION SE, Hamburg (DE)

( * ) Notice: Subject to any disclaimer, the term of this patent is extended or adjusted under 35 U.S.C. 154(b) by 1254 days.

(21) Appl. No.: 12/739,665

(22) PCT Filed: Oct. 13, 2008

(86) PCT No.: PCT/EP2008/008658

§ 371 (c)(1),
(2), (4) Date: Sep. 1, 2010

(87) PCT Pub. No.: WO2009/052968

PCT Pub. Date: Apr. 30, 2009

(65) Prior Publication Data

US 2010/0314874 A1    Dec. 16, 2010

(30) Foreign Application Priority Data

Oct. 23, 2007  (DE) .......................... 10 2007 050 644

(51) Int. Cl.
*G05B 19/042*    (2006.01)
*F03D 7/04*    (2006.01)
*F03D 7/02*    (2006.01)

(52) U.S. Cl.
CPC .......... *G05B 19/0421* (2013.01); *F03D 7/0284* (2013.01); *F03D 7/047* (2013.01);
(Continued)

(58) Field of Classification Search
USPC ............ 700/11, 12, 286, 287; 290/44; 341/88
See application file for complete search history.

(56) References Cited

U.S. PATENT DOCUMENTS 5,278,773 A    1/1994 Cousineau
8,103,389 B2 *  1/2012 Golden et al. ................ 700/295
(Continued)

FOREIGN PATENT DOCUMENTS

DE    10 2004 060 943    7/2006
EP    1 519 040    3/2005
(Continued)

OTHER PUBLICATIONS

International Search Report mailed on Feb. 4, 2009, directed to counterpart International Patent Application No. PCT/EP2008/008658; 4 pages.

(Continued)

*Primary Examiner* — Sean Shechtman
*Assistant Examiner* — Steven Garland
(74) *Attorney, Agent, or Firm* — Morrison & Foerster LLP

(57) ABSTRACT

A system and method for operating a wind energy installation or wind farm. The system includes a control unit configured to process control variables and a transfer module. The transfer module has an input interface for receiving control commands and an output interface for transmitting control variables to the control unit. The transfer module has multiple transfer logic elements each configured to convert a control command to a control variable. The transfer module has a switching device for switching between the transfer logic elements. As a result, the wind energy installation or wind farm can be connected to an electrical grid in which the control commands are transmitted in a different format than that of the control variables of the control unit.

19 Claims, 3 Drawing Sheets

(52) U.S. Cl.
CPC ............ *F03D 7/048* (2013.01); *F05B 2240/96* (2013.01); *F05B 2260/80* (2013.01); *F05B 2270/337* (2013.01); *G05B 2219/21128* (2013.01); *G05B 2219/2619* (2013.01); *Y02E 10/723* (2013.01)

(56) References Cited

U.S. PATENT DOCUMENTS

| | | | |
|---|---|---|---|
| 8,116,914 B2* | 2/2012 | Oohara et al. | 700/287 |
| 2002/0029097 A1 | 3/2002 | Pionzio, Jr. et al. | |
| 2002/0090001 A1 | 7/2002 | Beckwith | |
| 2004/0230377 A1 | 11/2004 | Ghosh et al. | |
| 2006/0029105 A1* | 2/2006 | Kasztenny et al. | 370/503 |
| 2009/0213872 A1* | 8/2009 | Lammers | 370/463 |
| 2009/0254224 A1* | 10/2009 | Rasmussen | 700/287 |

FOREIGN PATENT DOCUMENTS

| | | | |
|---|---|---|---|
| EP | 1 855 173 | | 11/2007 |
| EP | 2 127 291 | | 6/2008 |
| EP | 2 057 513 | | 5/2009 |
| EP | 2 057 519 | | 5/2009 |
| EP | 2 539 990 | | 1/2013 |
| WO | WO-2005/055538 | | 6/2005 |
| WO | WO 2006/130000 | * | 12/2006 |
| WO | WO-2007/136579 | | 11/2007 |
| WO | WO 2008/025357 | * | 3/2008 |
| WO | WO-2008/025357 | | 3/2008 |
| WO | WO-2008/025363 | | 3/2008 |
| WO | WO 2008/071189 | * | 6/2008 |
| WO | WO-2008/071189 | | 6/2008 |

OTHER PUBLICATIONS

International Standard IEC 61400-25. (Oct. 2006). "Information and Information Exchange for Wind Power Plants," Version 5: 1-2.

Olsen et al. (2006). Thesis: "Prototype for a IEC 61400-25 Compliant Generic Server," *Informatics and Mathematical Modeling, Technical University of Denmark*: 1-156.

Obergfell, H. (Dec. 2003). "Remote I/O-Modules with Power, Modem, GSM or Wireless Connection," Technology First-Hand vol. 3, PKS:115-118 with machine translation.

Texas Instruments. (2004). "Digital Bus Switch Selection Guide," *Texas Instruments: Technology for Innovators*: 1-24.

Triangle Microworks, Inc. (Dec. 2004). "SCADA Date Gateway," 3 pages.

Johnsson, A. "Communications for Monitoring and Control of Wind Power Plants," *Seminar IEC 61400-25*, Nov. 17, 2003, Boulder, CO: 1-47.

Zhu et al. (Nov. 2006). "An Implementation Principle of Protocol Plug-in Based on Technology of .NET Reflection," *North China Electr. Power Univ*.34(22): 60-83.

San Telmo et al. "The Use of IEC 61400-25 Standard to Integrate Wind Power Plants into the Control of Power System Stability," *European Wind Energy Conference & Exhibition*, May 7-10, 2007, Milan: 1-5.

* cited by examiner

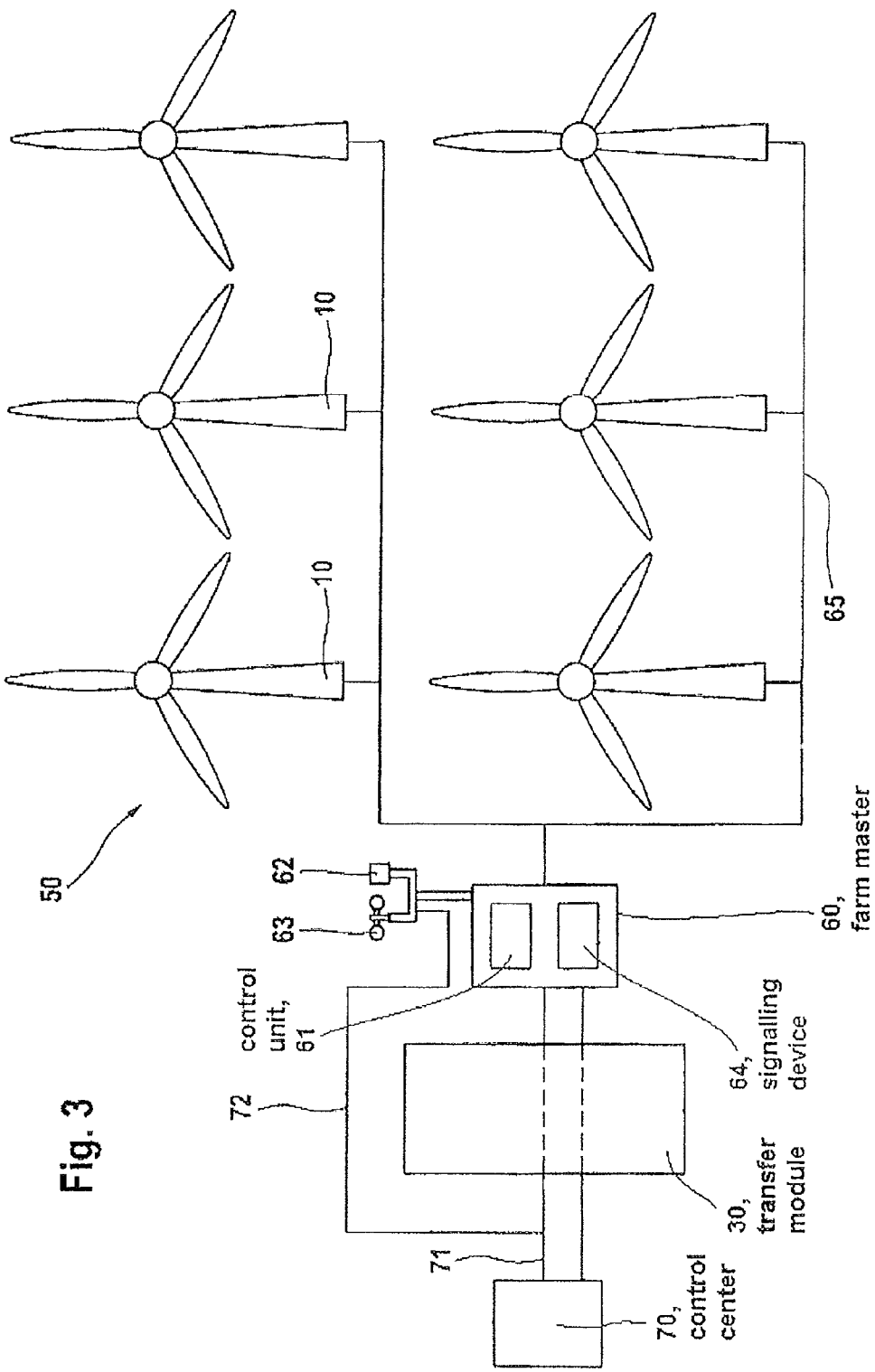

SYSTEM AND METHOD FOR OPERATING A WIND ENERGY INSTALLATION OR WIND FARM

REFERENCE TO RELATED APPLICATIONS

This application is a national stage application under 35 USC 371 of International Application No. PCT/EP2008/008658, filed Oct. 13, 2008, which claims the priority of German Patent Application No. 10 2007 050 644.0, filed Oct. 23, 2007, the contents of which prior applications are incorporated herein by reference.

FIELD OF THE INVENTION

The invention relates to an arrangement and a method for operation of a wind energy installation or of a wind farm. The arrangement comprises a control unit and a transfer module. The control unit is designed to process control variables. The transfer module has an input interface for receiving control commands, and an output interface for transmitting control variables to the control unit.

BACKGROUND OF THE INVENTION

During operation, wind energy installations are connected to the electrical grid of a wind farm. Wind farms are connected to the public supply grid. Both for the wind energy installation and for the wind farm, it is necessary to ensure that the electrical energy that is generated is fed into the respective grid in a form which is compatible with that grid. By way of example, the electrical energy is therefore fed into the grid at a specific frequency, at a specific voltage, and with a specific reactive power component.

The grid requirements are not constant. For example, the grid can demand that the maximum power be fed in at times in which it is subject to an increased load. When the voltages in the grid fall, the grid can additionally demand an increased reactive power component from the wind energy installation, in order to support the voltage.

The object of the control unit is to control the wind energy installation and the wind farm such that the electrical energy is provided in a manner which is compatible with the grid. In order to ensure that the control unit is provided with the information which it has to take into account for this task, control commands are issued. The control command represents a control variable for the control unit. The control variables are processed in the control unit, and the wind energy installation and the wind farm are controlled as a function of the control variables.

The communication directed at the control unit is organized differently on the grids of different operators. For example, the control commands for one operator may be transmitted in digital form, while the other operator uses analog control commands. For one operator, the nominal value of the reactive power may be defined as a percentage component of the total rating, while another operator transmits the corresponding control command as the phase angle φ between the current fed in and the grid voltage.

Until now, it has been normal practice to match the control units to the requirements of the respective operator and of the respective grid. However, this results in considerable complexity. For example, when producing a wind energy installation and when setting up a wind farm, it is first of all necessary to know the grid in which the wind energy installation or the wind farm will be used, before the control unit can be completed. A multiplicity of parallel versions of the control unit must be kept available and developed further for maintenance of existing wind energy installations and wind farms.

SUMMARY OF THE INVENTION

The invention is based on the object of providing an arrangement and a method of the type mentioned initially, in which the control unit can be designed and maintained with less complexity. The object is achieved by the features broadly disclosed herein. Advantageous embodiments are specified in the disclosure below.

According to the invention, the transfer module of the arrangement comprises a plurality of transfer logic elements. Each transfer logic element is designed to convert a control command to a control variable. The transfer module comprises a switching device, by means of which it is possible to switch between the transfer logic elements.

The control variables for which the control unit is designed are determined in the method according to the invention. The method determines which control commands are provided in the relevant grid for the control unit. A plurality of transfer logic elements are provided in a transfer module, with the transfer logic elements being designed to convert the control commands to control variables. One appropriate transfer logic element is selected from the plurality of transfer logic elements.

First of all, a number of terms will be explained. A control command is intended to influence the control unit. The control command is dependent on circumstances outside the control unit, for example the quality of the voltage or other physical characteristic variables of the electrical grid, the time of day, the wind direction or the brightness level. The control command may be in a format in which it cannot be processed by the control unit. A control variable differs from a control command in that it is in a format which can be processed by the control unit. Both a control command and a control variable may comprise a plurality of physical actuating parameters, such as the grid voltage, reactive power, real power and/or frequency. A plurality of actuating parameters can be transmitted in parallel with one another, by means of one control command. However, the invention also covers control commands by means of which changing actuating parameters are transmitted in a time sequence. This may be the case, for example, when specific actuating parameters, on which the control system depends, are not transmitted continuously but are transmitted only at those times at which the grid expects a reaction from the wind energy installation or from the wind farm.

The transfer module is designed to convert control commands to control variables. For this purpose, a control command which arrives at the transfer module via an input interface is transferred to the transfer logic element appropriate for that control command. The transfer logic element processes the control command and converts it such that it becomes a control variable. When the control variable is transmitted via the output interface to the control unit, the control unit can control the wind energy installation or the wind farm as is desired on the basis of the control command.

The switching device is used to switch between the transfer logic elements. Before switching, a control command which has arrived at the transfer module via the input interface is passed to a first transfer logic element, where it is processed. After switching, the control command is no longer passed to the first transfer logic element, but to a second transfer logic element, where it is processed.

The arrangement according to the invention has the advantage that a standard control unit can be used ex-works, irrespective of the grid to which the wind energy installation or the wind farm will be connected. The control variables of the control unit can be freely selected. For connection to the grid, one transfer module according to the invention is connected between the wind energy installation and the grid. In the transfer module, the transfer logic element which is activated is that which is designed to convert the control commands for the relevant grid to the format required by the control unit. The other transfer logic elements are inactive.

The invention allows the development and the operation of wind energy installations to be considerably rationalized. The department in which the control unit is developed need only communicate as a function of which control variables the control unit will later process. Apart from this, it can concentrate completely on developing the control unit per se. Another development department can deal with the transfer module. This development department will know the control variables with which the control unit will operate, and which control commands are used in the various grids. It can develop a transfer logic element for the control commands for each grid, and combine the plurality of transfer logic elements in the transfer module. Bearing in mind the multiplicity of grids which are operated throughout the world, a transfer module may in fact comprise 5, 10 or 20 transfer logic elements. If a further grid is added, then all that is needed is to add one transfer logic element. If the control commands in a grid change, then all that is needed is to change the corresponding transfer logic element. In both cases, the control unit itself remains unchanged.

The arrangement according to the invention can play out its preferences simply by the control command and the control variable each comprising only a single actuating parameter. In the simplest case, the actuating parameter is the same in both cases, and the difference is restricted to the actuating parameter in the control command being represented in a different manner than that required for the control variable. For example, the actuating parameter in the control command may be represented by an analog electrical signal between 0 and 20 mA, while the control variable uses an analog scale from 4 to 20 mA. The transfer logic element then just has to carry out a proportional conversion. There may also be a non-proportional relationship between the actuating parameter of the control command and the actuating parameter of the control variable. This may be the case, for example, when the control command presets a nominal value for the reactive power in the form of a specific phase angle $\phi$ between the current fed in and the grid voltage, while a proportional factor is processed as the control variable, reflecting the proportion of the reactive power within the overall rating. Alternative actuating parameters which can represent the reactive power are sine $\phi$, cos $\phi$ and tan $\phi$. However, the control command may also represent a variable via which the control variable can be derived by means of a functional relationship. For example, the control command may represent the voltage of the connected electrical grid, and the transfer logic element can determine the reactive power, as a control variable, by means of a function or a look-up table, maintaining the voltage in a defined voltage range.

In many cases, a single actuating parameter of the control variable depends on a plurality of actuating parameters contained in the control command. For example, the nominal value which is used as a control variable for the reactive power may depend on the one hand on the electrical characteristic values of the grid, for example by a higher reactive power being demanded when the voltage in the grid falls.

Furthermore, the nominal value for the reactive power may also depend on the time of day or the brightness level, for example because a large amount of reactive power is normally required at certain times of day. A transfer logic element can then be provided which converts a control command, which comprises a plurality of actuating parameters, to a control variable which comprises only one actuating parameter.

Conversely, a plurality of actuating parameters in the control variable may also depend on a single actuating parameter of a control command. If, for example, the control command presets switching of the wind energy installation from the daytime mode to the nighttime mode, then this may require on the one hand a varied nominal value for the reactive power, and on the other hand switching to reduced-noise operation. In consequence transfer logic elements may be provided in which the control command comprises a single actuating parameter, while the control variable comprises a plurality of actuating parameters. This also applies to the situation in which the change in a single actuating parameter in the control command after a predetermined limit value has been exceeded requires a different reaction from the control unit than during normal operation. For example, if the grid voltage falls, the wind energy installation should remain connected to the grid for a different length of time, depending on the discrepancy between the grid voltage and its rated value, and different amounts of reactive current should be fed in in order to contribute to stabilization of the voltage. If the voltage falls to a value of less than 80% of normal voltage, then the wind energy installation must be disconnected from the grid after three seconds at most, and must feed in a first reactive current. In the event of a voltage drop to 15% of the normal value, the wind energy installation must not remain connected to the grid for more than 150 ms, but should, for this purpose, feed in a higher, second reactive current. A transfer logic element can also convert processes of this type to the appropriate control variables. In this context, it is possible in particular to take account as actuating parameters of who the operator of the grid is and in what state the grid has been set up, because the processes when a limit value is exceeded depend on the operator and on the state. These processes may be stored in the transfer logic element, and the control command may comprise a regional identification as an actuating parameter, thus ensuring the appropriate process for the regional grid.

The invention also covers transfer logic elements in which both the control command and the control variable comprise a plurality of actuating parameters. The transfer module can be designed such that the control commands and the control variables of the transfer logic elements each comprise the same number of actuating parameters. However, it is also possible to combine a plurality of transfer logic elements with one another in one transfer module, in which transfer logic elements the number of actuating parameters in the control command and in the control variable is different. It is likewise possible to process a plurality of control commands in parallel in one transfer logic element.

The transfer module can be designed such that a single transfer logic element in the transfer module can process and convert to control variables all the control commands which occur in a specific grid environment of the wind energy installation or of the wind farm. The relevant transfer logic element is then activated on commissioning, and there is no longer any need for switching to a different transfer logic element during normal operation. The transfer logic elements can be implemented ex-works in a fixed form in the transfer module. It may be sufficient for switching between the transfer logic elements to be possible on site only by an operator.

A single transfer logic element for all types of control commands and operating states may turn out to be highly complex. The invention therefore also covers the idea of switching between the transfer logic elements as a function of the operating state. For example, one transfer logic element may be provided for daytime operation, and one transfer logic element for nighttime operation. It is then possible to switch between the transfer logic elements as a function of the time of day or the brightness level. The switching device may be designed to react to appropriate requirements from a control center, or signals from a sensor. It is likewise possible for one transfer logic element to be intended for normal operation, and for a different transfer logic element to be intended for disturbances. If an actuating parameter, for example the grid voltage, then exceeds a predetermined limit value, switching takes place to the transfer logic element for disturbances.

It is also possible to provide for the transfer logic elements of the transfer module to be modified, or for new transfer logic elements to be added to the transfer module. A modified transfer logic element may be required, for example, when the wind energy installation is provided with a new control unit which is designed for different control variables, or when the control commands change. In one advantageous embodiment, a transfer logic element can be modified without any need for an operator to be present on site. The data for the modified transfer logic element can be transmitted from a control center via a data line to the control unit.

An active transfer logic element cannot be modified without shutting down the wind energy installation during this time. Instead of modifying the active transfer logic element, it may therefore be advantageous to add a new transfer logic element to the transfer module. Once the new transfer logic element has transferred completely, it is possible to switch from the previous transfer logic element to the new transfer logic element. Particularly for this purpose, the switching device may be remotely controllable. The steps of adding or deleting transfer logic elements can be carried out by remote control. A memory area is provided in the transfer module for this purpose, to which the data required for a transfer logic element can be transferred via a data line.

A signal flow can also be provided in the opposite direction, that is to say from the wind energy installation or the wind farm to the grid. A state variable which is defined in the wind energy installation or in the wind farm is then transmitted to the grid in order that it is possible to take account of the status of the wind energy installation or of the wind farm when control commands are issued. For example, the arrangement may comprise a signaling device by means of which the information relating to the available reactive power can be transmitted to the respective grid. The information relating to the available reactive power can then be taken into account in the control commands in such a way that no more reactive power is demanded from the wind energy installation or from the wind farm than is available. It must be remembered that the reactive power that is actually available for the grid is less than the reactive power emitted from the wind energy installation, since a portion of the reactive power is lost in the other operating equipment in the arrangement, such as transformers and cables. A direct signal connection may exist between the wind energy installation or the wind farm and the grid, via which the state variables are transmitted to the grid. However, it is also possible to also pass the information relating to the state variable through the transfer module, and to convert it there to a format in which it can be processed by the grid. The transfer module can therefore also process a signal flow in the opposite direction.

The control unit according to the invention may be the control unit of a wind energy installation. The control unit may be arranged in the wind energy installation, although this is not necessary. The invention also relates to a wind energy installation which has a control unit such as this and a transfer module according to the invention, and to an arrangement having a wind energy installation, a control unit and a transfer module according to the invention. The control commands then depend primarily on the requirements of the farm master and on the status of the grid within the wind farm. The control commands may, however, also depend on the circumstances which are found directly in the vicinity of the wind energy installation. For example, the wind direction or the brightness level can be detected by a sensor which is arranged on the wind energy installation. The invention covers the idea of control commands which depend on locally found circumstances such as these being passed together with control commands of the grid to the transfer module, where they are processed jointly.

In an alternative embodiment, the control unit is the control unit of a farm master. A farm master is any device which carries out control tasks for a wind farm, that is to say for a plurality of wind energy installations. In particular, the farm master can produce the link between the wind farm and the public electricity supply grid system. The control unit may be arranged at the farm master or at a different point. In this case, the control commands depend primarily on the state of the public supply grid system and on the requirements of the operator. The invention also relates to a wind farm having a farm master, having a control unit such as this, and having a transfer module according to the invention.

BRIEF DESCRIPTION OF THE DRAWINGS

The invention will be described in the following text on the basis, for example, of one advantageous embodiment and with reference to the attached drawings, in which:

FIG. 3 shows a second embodiment of an arrangement according to the invention.

DETAILED DESCRIPTION OF THE INVENTION

Figure 1:
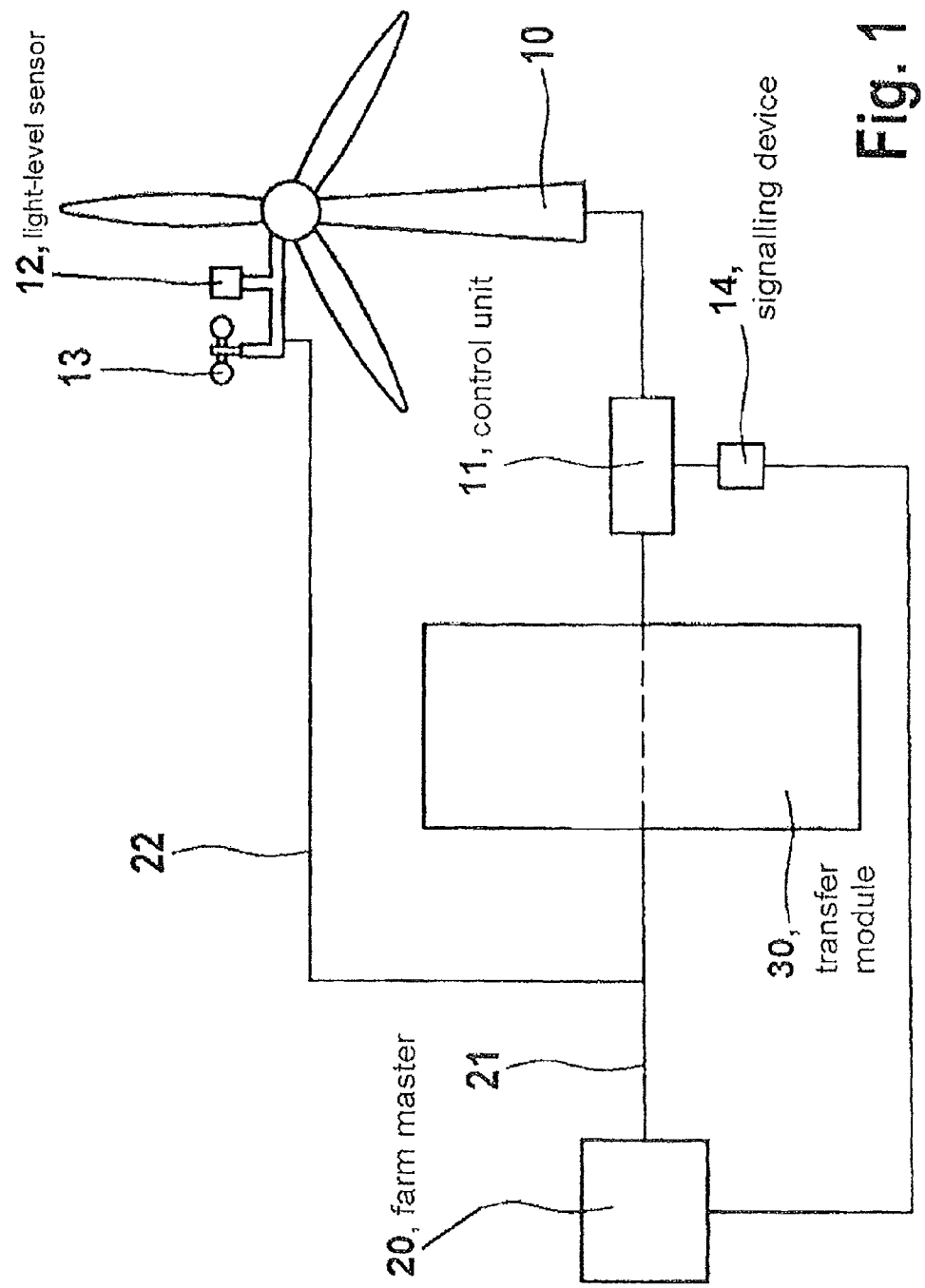
FIG. 1 shows a first embodiment of an arrangement according to the invention.

A wind energy installation 10 in FIG. 1 is included in a wind farm, which is not illustrated. A control unit 11 for the wind energy installation 10 is designed to process control variables, and to control the wind energy installation 10 as a function of the control variables. A farm master 20, which carries out control tasks for the wind farm and produces a link to the public supply grid system, generates control commands and therefore defines requirements for the control unit 11 for the wind energy installation 10. A control command, for example, may relate to a requirement for the reactive power or the real power. The control commands are output from the farm master 20 in a format which does not match the format of the control variables for the control unit 11. The control unit 11 therefore cannot process the control commands in the format used by the farm master 20.

Figure 2:
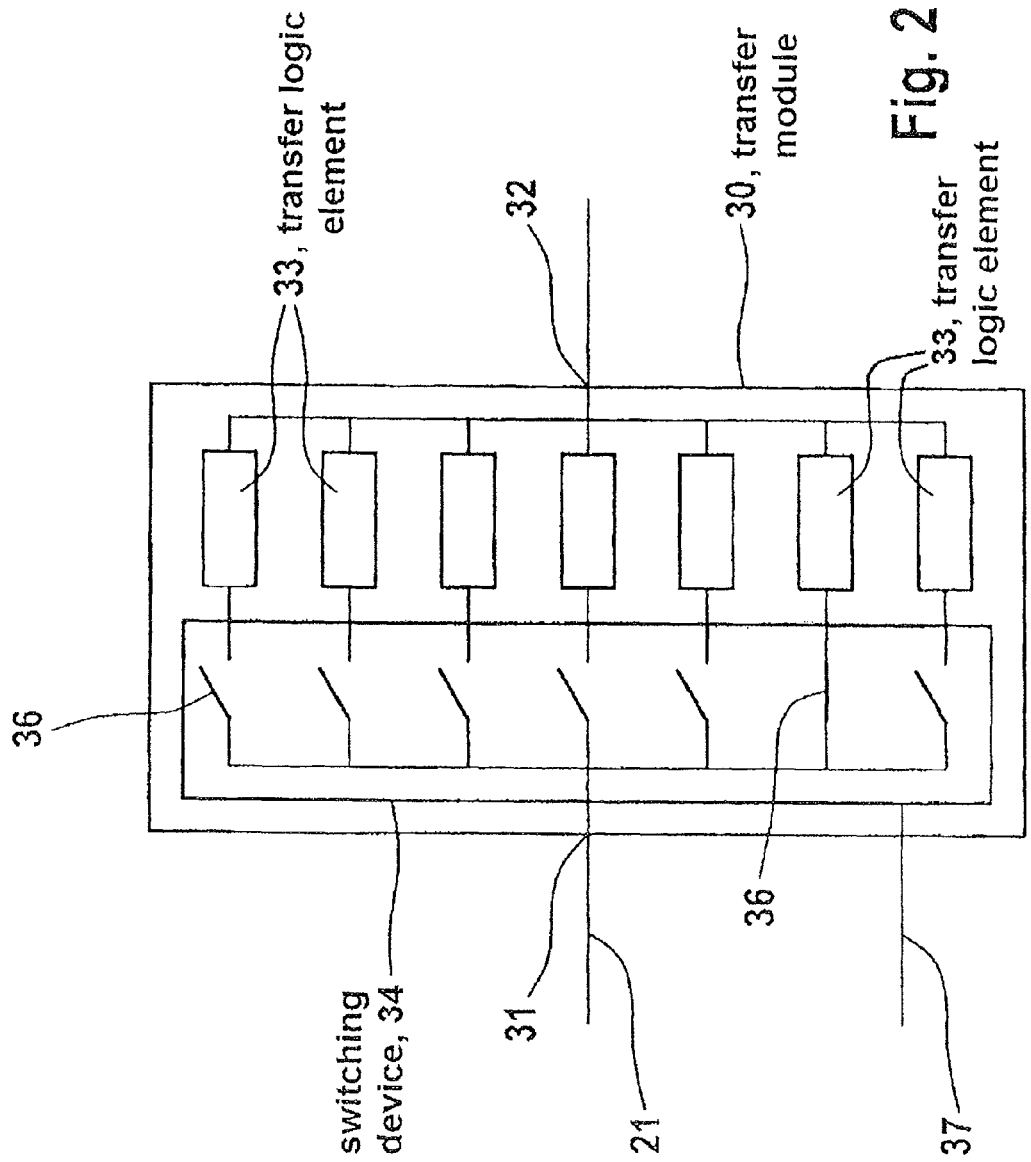
FIG. 2 shows a transfer module according to the invention.

Therefore, the control commands from the farm master 20 are first of all transmitted via a control line 21 to a transfer module 30. A transfer module 30, which is illustrated in FIG. 2, has an input interface 31 via which the control commands are passed to the transfer module 30. In the transfer module 30, the control commands are converted such that they can be processed by the control unit 11. The transfer module 30 therefore converts the control commands to control variables. The control variables are transmitted to the control unit 11 via an output interface 32 of the transfer module 30.

In order to convert the control commands to control variables, the transfer module has a plurality of transfer logic elements 33. The transfer logic elements 33 are each designed to convert different types of control commands to control variables.

The transfer logic element 33 which is chosen in the transfer module 30 is that which is appropriate for the control commands from the farm master 20. The relevant transfer logic element 33 is activated, and the other transfer logic elements 33 remain inactive. A switching device 34 is provided in order to switch between the transfer logic elements 33, and has a plurality of switches 36. A transfer logic element 33 is activated by closing the associated switch 36. The switches 36 are coupled to one another by the switching device 34 such that the other switches 36 remain open when one of the switches 36 is closed. Only one transfer module 33 is therefore ever active. The switching device can receive control signals via a signal line 37 and can switch between the transfer logic elements 33, corresponding to the control signals. The control signal may be a command from a control center or a signal from a sensor or from the grid, or a value which can be set in the transfer module. It is likewise possible for the transfer logic elements 33 to be modified from the control center via the signal line, or for further transfer logic elements 33 to be added to the transfer module 30.

If the transfer module 30 is intended to be operated with other control commands, then the switch 34 of the previously active transfer logic element 33 is opened, and the switch 34 of the transfer logic element 33 which is appropriate for the new control commands is closed. It is therefore possible to switch between the transfer logic elements 33.

The wind energy installation 10 has a light-level sensor 12 and a wind strength meter 13. The output signals from the light-level sensor 12 and from the wind strength meter 13 are likewise control commands which the control unit 11 takes into account when controlling the wind energy installation 10. The signals are passed via a control line 22 to the input interface 31 of the transfer module 30, and are processed in the transfer module 30 together with the control commands from the farm master 20.

The control unit 11 has a function which determines how much reactive power the wind energy installation 10 can supply. The available reactive power is signaled to the farm master 20 via a signaling device 14. The farm master 20 aligns its requirement for the reactive power with how much reactive power is available.

FIG. 3 shows another embodiment of an arrangement according to the invention. A plurality of wind energy installations 10 are connected to form a wind farm 50. A farm master 60 is connected via a control line 65 to the wind energy installations 10 in the wind farm 50. The farm master 60 has a control unit 61 and a signaling device 64.

A control center 70 for the public supply grid system uses control commands to place requirements on the control unit 61 for control of the wind farm 50. The control commands from the control center 70 are in a format which does not match the format of the control variables which can be processed by the control unit 61. Therefore, the control commands are first of all passed via a control line 71 to the transfer module 30, where they are converted to control variables for the control unit 61.

The farm master 60 furthermore has a light-level sensor 62 and an anemometer 63. The output signals from the light-level sensor 62 and from the anemometer 63 are likewise taken into account as control commands for the control of the wind farm 50. For this purpose, the output signals are passed via a control line 72 to the transfer module 30, where they are processed together with the control commands from the control center 70.

The signaling device 64 in the farm master 60 transmits the status information from the wind farm to the control center 70, for example how much reactive power the wind farm 50 is supplying and could still supply. The signals from the signaling device 64 are passed through the transfer module and are converted in the transfer module to a format in which they can be processed by the control center 70. When demanding reactive power, the control center 70 takes account of the information received from the signaling device 64.

The invention claimed is:

1. A system for operating a wind energy installation or a wind farm, comprising:
   a control unit configured to process control variables and to control the wind energy installation or the wind farm as a function of the control variables; and
   a transfer module having an input interface configured to receive control commands, an output interface configured to transmit control variables to the control unit, a plurality of transfer logic elements each configured to convert a control command to a control variable, and a switching device configured to switch between the transfer logic elements in response to a control signal,
   wherein the transfer logic elements comprise a first transfer logic element and a second transfer logic element,
   wherein before switching occurs by the switching device all input control commands are passed to the first transfer logic element and after switching occurs by the switching device all input control commands are passed to the second transfer logic element, and
   wherein the first transfer logic element is configured to convert a first control command into a control variable and the second transfer logic element is configured to convert a second control command into a control variable, the first control command being given in a first format and the second control command being given in a second format different from the first format.

2. The system of claim 1, wherein a control command and each control variable comprises one or more actuating parameters.

3. The system of claim 2, wherein the one or more actuating parameters of a control variable comprise at least one of a frequency of an electrical grid, a real power, a reactive power, a voltage of the electrical grid, and volt amperes.

4. The system of claim 2, wherein the one or more actuating parameters of a control command comprise a regional identification.

5. The system of claim 1, wherein a control command comprises a plurality of actuating parameters.

6. The system of claim 1, wherein a control variable comprises a plurality of actuating parameters.

7. The system of claim 1, wherein a characteristic representing a relationship between a control command and a control variable is stored in a transfer logic element.

8. The system of claim 1, wherein the switching device is configured to switch between the transfer logic elements as a function of control signals.

9. The system of claim 1, wherein the switching device is remotely controllable.

10. The system of claim 1, wherein a number of transfer logic elements in the transfer module is variable.

11. The system of claim 10, wherein a number of transfer logic elements in a remote control is variable.

12. The system of claim 1, further comprising a signaling device for available reactive power.

13. The system of claim 1, wherein the control unit is the control unit of the wind energy installation.

14. The system of claim 1, wherein the control unit is the control unit of a farm master.

15. The system of claim 1, wherein a control command and a control variable each comprise only one actuating parameter.

16. A method for operating a wind energy installation or a wind farm controlled by a control unit, the method comprising:
 determining control variables for which the control unit is configured;
 determining control commands intended for the control unit; and
 selecting one transfer logic element from a plurality of transfer logic elements available in a transfer module by using a switching device,
 wherein the transfer logic elements are configured to convert the control commands to the control variables,
 wherein the transfer logic elements comprise a first transfer logic element and a second transfer logic element,
 wherein before switching occurs by the switching device all input control commands are passed to the first transfer logic element and after switching occurs by the switching device all input control commands are passed to the second transfer logic element, and
 wherein the first transfer logic element is configured to convert a first control command into a control variable and the second transfer logic element is configured to convert a second control command into a control variable, the first control command being given in a first format and the second control command being given in a second format different from the first format.

17. The method of claim 16, further comprising remotely activating the selected transfer logic element.

18. The method of claim 16, further comprising remotely varying between the transfer logic elements in the transfer module.

19. The method of claim 16, further comprising remotely adding a transfer logic element to the transfer module.

* * * * *